(12) United States Patent
Koyama et al.

(10) Patent No.: US 12,352,854 B2
(45) Date of Patent: Jul. 8, 2025

(54) OBJECT DETECTION DEVICE

(71) Applicant: DENSO CORPORATION, Kariya (JP)

(72) Inventors: Yu Koyama, Nisshin (JP); Mitsuyasu Matsuura, Nisshin (JP); Takuya Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 369 days.

(21) Appl. No.: 17/315,091

(22) Filed: May 7, 2021

(65) Prior Publication Data
US 2021/0263149 A1 Aug. 26, 2021

Related U.S. Application Data

(63) Continuation of application No. PCT/JP2019/041357, filed on Oct. 21, 2019.

(30) Foreign Application Priority Data

Nov. 9, 2018 (JP) ................................. 2018-211639

(51) Int. Cl.
*G01S 15/36* (2006.01)
*G01S 7/527* (2006.01)
*G01S 7/539* (2006.01)
*G01S 15/10* (2006.01)

(52) U.S. Cl.
CPC .............. *G01S 15/36* (2013.01); *G01S 7/527* (2013.01); *G01S 7/539* (2013.01); *G01S 15/104* (2013.01)

(58) Field of Classification Search
CPC .......... G01S 15/36; G01S 7/527; G01S 7/539; G01S 15/104
See application file for complete search history.

(56) References Cited

U.S. PATENT DOCUMENTS

| | | | | |
|---|---|---|---|---|
| 5,216,429 A | * | 6/1993 | Nakagawa | ................ G01S 5/06 342/465 |
| 2017/0212231 A1 | * | 7/2017 | Iwai | ...................... G01S 7/2921 |
| 2018/0217243 A1 | * | 8/2018 | Sasakura | ................. G01S 15/89 |

(Continued)

FOREIGN PATENT DOCUMENTS

| | | |
|---|---|---|
| JP | S57-171582 U | 10/1982 |
| JP | 61-271485 A | 12/1986 |
| JP | 2-296180 A | 12/1990 |

(Continued)

*Primary Examiner* — Isam A Alsomiri
*Assistant Examiner* — Abdallah Abulaban
(74) *Attorney, Agent, or Firm* — Maschoff Brennan

(57) ABSTRACT

An object detection device includes a drive signal generation unit provided to generate a drive signal for driving a transmitter configured to transmit a search wave to the outside, and a control unit provided to control output of the drive signal from the drive signal generation unit to the transmitter. The drive signal generation unit generates a first drive signal corresponding to a first search wave and a second drive signal corresponding to a second search wave having an encoding scheme that is different from the encoding scheme of the first search wave. The control unit causes the drive signal generation unit to output the first drive signal and the second drive signal to the transmitter at different timings so that one of the first and second search waves is transmitted in a transmission interval between transmissions of the other search wave.

9 Claims, 8 Drawing Sheets

(56) References Cited

U.S. PATENT DOCUMENTS

2020/0025917 A1\* 1/2020 Kozuki .................. G01S 15/89

FOREIGN PATENT DOCUMENTS

| JP | H03-096890 A | 4/1991 | | |
|----|----|----|----|----|
| JP | H03-096980 A | 4/1991 | | |
| JP | H08-188102 A | 7/1996 | | |
| JP | H09-096674 A | 4/1997 | | |
| JP | 10-039016 A | 2/1998 | | |
| JP | 3141278 B2 \* | 3/2001 | | |
| WO | WO-2018062121 A1 \* | 4/2018 | ............. | B60R 21/00 |

\* cited by examiner

OBJECT DETECTION DEVICE

CROSS-REFERENCE TO RELATED APPLICATIONS

This application is the U.S. bypass application of International Application No. PCT/JP2019/041357 filed on Oct. 21, 2019 which designated the U.S. and claims priority to Japanese Patent Application No. 2018-211639 filed on Nov. 9, 2018, the contents of both of which are incorporated herein by reference.

TECHNICAL FIELD

The present disclosure relates to an object detection device configured to detect objects around the device.

BACKGROUND

JP 1991-96980 A discloses a distance measuring device for a traveling body. The distance measuring device disclosed in JP 1991-96980 A emits ultrasonic pulse signals from a traveling automobile and receives the reflected signals from an object to be detected to measure the distance to the object such as another automobile. Specifically, the distance measuring device disclosed in JP 1991-96980 A comprises a transmission control means and a plurality of ultrasonic sensors. The ultrasonic sensors emit ultrasonic pulse signals having different frequencies and receive the reflected ultrasonic pulse signals. The transmission control means controls emission of the ultrasonic pulse signals from the ultrasonic sensors so that they are emitted at specified intervals and with different phases. Further, the transmission control means changes the period in accordance with the distance to the object to be detected so that the next ultrasonic pulse signal is transmitted after a specified time from the reception of the transmission ultrasonic pulse reflected by the object to be detected.

SUMMARY

An object detection device is configured to detect a surrounding object.

According to one aspect of the present disclosure, an object detection device includes a drive signal generation unit provided to generate a drive signal that drives a transmitter including a transmitter for externally transmitting search waves, and a control unit provided to control output of the drive signal from the drive signal generation unit to the transmitter.

The drive signal generation unit generates a first drive signal corresponding to a first search wave and a second drive signal corresponding to a second search wave having an encoding scheme that is different from the encoding scheme of the first search wave, and the control unit causes the drive signal generation unit to output the first drive signal and the second drive signal to the transmitter at different timings so that one of the first and second search waves is transmitted in a transmission interval between transmissions of the other search wave.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
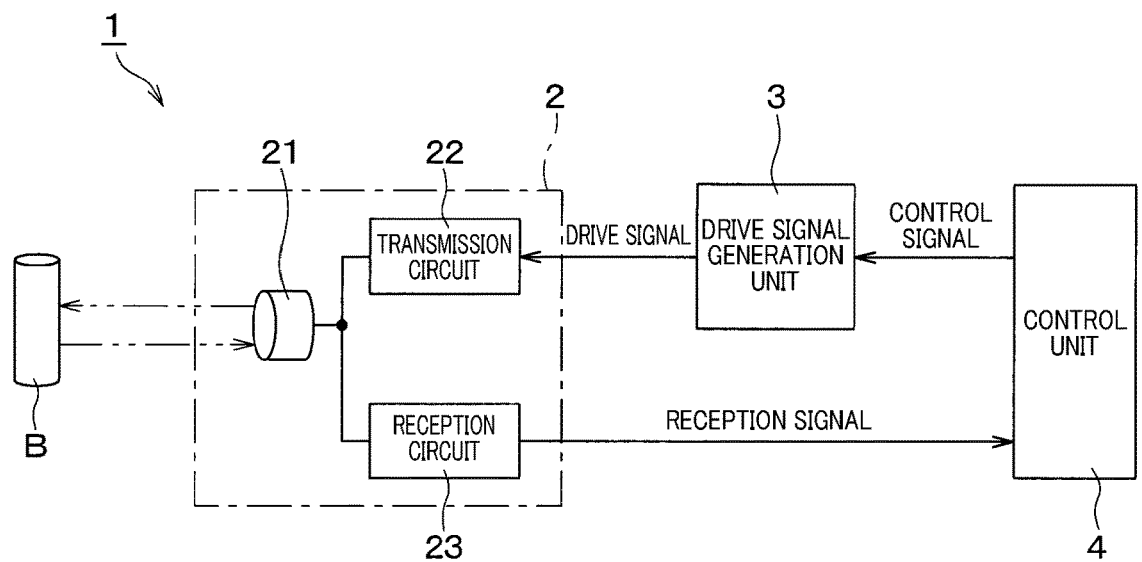
FIG. 1 is a block diagram showing the general configuration of an object detection device according to an embodiment.

Regarding the device disclosed in JP 1991-96980 A, there is demand to provide a device that can reduce the object detection period as much as possible for both the short-distance range and the long-distance range with a simpler device configuration. The present disclosure has been devised in view of the above-exemplified circumstances and the like.

An object detection device is configured to detect a surrounding object.

According to one aspect of the present disclosure, an object detection device includes a drive signal generation unit provided to generate a drive signal that drives a transmitter including a transmitter for externally transmitting search waves, and a control unit provided to control output of the drive signal from the drive signal generation unit to the transmitter.

The drive signal generation unit generates a first drive signal corresponding to a first search wave and a second drive signal corresponding to a second search wave having an encoding scheme that is different from the encoding scheme of the first search wave, and the control unit causes the drive signal generation unit to output the first drive signal and the second drive signal to the transmitter at different timings so that one of the first and second search waves is transmitted in a transmission interval between transmissions of the other search wave.

In this configuration, the drive signal generation unit generates a first drive signal corresponding to a first search wave and a second drive signal corresponding to a second search wave having an encoding scheme that is different from the encoding scheme of the first search wave. The control unit causes the drive signal generation unit to output the first drive signal and the second drive signal to the transmitter at different timings so that one of the first and second search waves is transmitted in a transmission interval between transmissions of the other search wave. The transmitter transmits the first search wave when the first drive signal is input, and transmits the second search wave when the second drive signal is input.

Thus, in the above-described configuration, the drive signal generation unit outputs the first drive signal and the second drive signal to the transmitter at different timings under the control of the control unit. As a result, one of the first and second search wave, which has different encoding schemes, is transmitted in a transmission interval between transmissions of the other search wave. Therefore, it is possible to provide an object detection device that can reduce the object detection period as much as possible for both the short-distance range and the long-distance range with a simpler device configuration.

The documents included in this application may contain reference symbols assigned to components. However, such reference symbols simply indicate examples of the correspondence between the components and specific means described in connection with embodiments described later. Therefore, the present disclosure is not limited by such reference signs.

EMBODIMENTS

Embodiments of the present disclosure will be described below with reference to the drawings. It should be noted that, if various modifications applicable to one embodiment are inserted in the middle of a series of explanations relating to the embodiment, the understanding of the embodiment may be hindered. Thus, the modifications will be described together after the description of the embodiment.

Configuration

Referring to FIG. 1, the object detection device 1 is mounted on a vehicle (not shown), for example, an automobile, and is configured to detect an object B around the vehicle. The vehicle equipped with the object detection device 1 is hereinafter referred to as a "host vehicle". In the present embodiment, the object detection device 1 has a configuration as a so-called ultrasonic sensor. That is, the object detection device 1 transmits a search wave, which is an ultrasonic wave, externally from the host vehicle and receives the reflection of the search wave from the object B to acquire the distance to the object B. Specifically, the object detection device 1 includes a transceiver 2, a drive signal generation unit 3, and a control unit 4.

The transceiver 2 can function as a transmitter and a reception unit. That is, the transceiver 2 includes a transducer 21, a transmission circuit 22, and a reception circuit 23. The transducer 21 is electrically connected to the transmission circuit 22 and the reception circuit 23.

The transducer 21 has a function as a transmitter for externally transmitting search waves and a function as a receiver for receiving the reflected wave. Specifically, the transducer 21 is configured as an ultrasonic microphone provided with electrical-mechanical energy conversion elements such as piezoelectric elements. The transducer 21 is provided at a position facing the outer surface of the host vehicle so that the search wave can be transmitted externally from the host vehicle and the reflected wave can be received from the outside of the host vehicle.

The transmission circuit 22 is configured to make the transducer 21 transmit a search wave by driving the transducer 21 based on the input drive signal. Specifically, the transmission circuit 22 has components such as a digital/analog conversion circuit. That is, the transmission circuit 22 is configured to perform processing such as digital/analog conversion on the drive signal output from the drive signal generation unit 3 and apply the AC voltage thus generated to the transducer 21.

The reception circuit 23 is configured to output a received signal corresponding to the reception state of ultrasonic waves at the transducer 21 to the control unit 4. Specifically, the reception circuit 23 has an amplifier circuit and an analog/digital conversion circuit. That is, the reception circuit 23 is configured to amplify the voltage input from the transducer 21 and then perform analog/digital conversion to generate and output a received signal corresponding to the amplitude of the received ultrasonic wave.

In this way, the transceiver 2 is configured to transmit a search wave by the transducer 21 as a transmitter/receiver and receive the reflected wave by the transducer 21 to generate a received signal corresponding to the distance to the object B.

In the present embodiment, the transceiver 2 is capable of transmitting search waves having different encoding schemes. Further, one transceiver 2 has one transducer 21. That is, the transceiver 2 is configured to be capable of transmitting search waves having different encoding schemes from a common transducer 21. Specifically, the transceiver 2 is configured to be capable of generating search waves modulated in different ways with respect to the fundamental wave. The fundamental wave is a sinusoidal ultrasonic wave having a constant frequency that is substantially the same as or near the resonance frequency of the transducer 21. The resonance frequency of the transducer 21 may be simply referred to as "resonance frequency" below.

The drive signal generation unit 3 is configured to generate a drive signal when the transceiver 2 serves as the transmitter. The drive signal is a signal for driving the transceiver 2 so as to transmit search waves from the transducer 21.

The drive signal generation unit 3 is configured to generate a plurality of drive signals corresponding to a plurality of search waves having different encoding schemes. Further, in the present embodiment, the drive signal generation unit 3 outputs the drive signals selectively, and not simultaneously, to the same transceiver 2.

In the present embodiment, the transceiver 2 is configured to transmit two types of search waves having different encoding schemes, that is, a first search wave and a second search wave selectively but not simultaneously with each other. In accordance with this, the drive signal generation unit 3 generates two types of drive signals, that is, a first drive signal corresponding to the first search wave and a second drive signal corresponding to the second search wave having an encoding scheme that is different from that of the first search wave, and outputs them selectively but not simultaneously with each other.

Figure 2A:
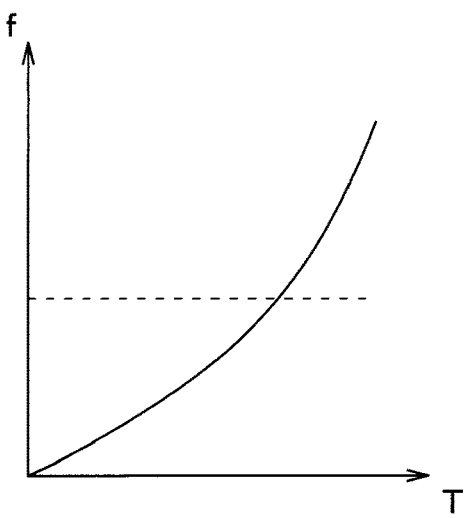
FIG. 2A is a graph showing an example of the frequency characteristics of a drive signal output by the drive signal generation unit shown in FIG. 1.
Figure 2B:
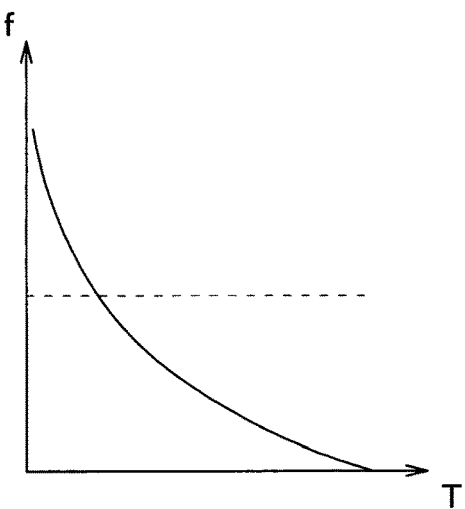
FIG. 2B is a graph showing an example of the frequency characteristics of a drive signal output by the drive signal generation unit shown in FIG. 1.

In the present embodiment, the drive signal generation unit 3 is configured to generate the first drive signal and the second drive signal such that the first search wave and the second search wave have different modulated states. FIGS. 2A and 2B show examples of the first drive signal and the second drive signal in a case where the first search wave and the second search wave have different frequency-modulation schemes. That is, FIG. 2A shows an example of the frequency characteristics of the first drive signal. FIG. 2B shows an example of the frequency characteristics of the second drive signal. In FIGS. 2A and 2B, the horizontal axis T indicates time, the vertical axis f indicates frequency, and the broken line indicates resonance frequency. In this example, the first and second search waves have different chirp-encoding schemes. That is, the first search wave has up-chirp modulation. On the other hand, the second search wave has down-chirp modulation. In accordance with this, as shown in FIG. 2A, the first drive signal has a frequency sweep pattern in which the frequency rises beyond the resonance frequency. On the other hand, the second drive signal has a frequency sweep pattern in which the frequency drops beyond the resonance frequency.

The control unit 4 is configured to control the output of the drive signal from the drive signal generation unit 3 to the transceiver 2 and process the received signal received from the transceiver 2. That is, the control unit 4 is configured to control the transmission state of search waves from the transceiver 2 by outputting control signals to the drive signal generation unit 3. Further, the control unit 4 is configured to detect the presence of the object B and the distance between the transducer 21 and the object B by receiving the received signal from the reception circuit 23 while controlling the operation of the reception circuit 23.

The control unit 4 is configured to control the drive signal generation unit 3 so that the drive signal generation unit 3 outputs a plurality of types of drive signals discretely and at predetermined timings to the transceiver 2. Specifically, the control unit 4 causes the drive signal generation unit 3 to output the first drive signal and the second drive signal to the transceiver 2 at different timings so that the search waves are transmitted in a predetermined manner. "Predetermined manner" means that one of the first and second search waves is transmitted in a transmission interval between transmissions of the other search wave.

Outline of Operation

Next, the outline of the operation of the configuration of the present embodiment will be described together with the effects provided by the configuration with reference to the drawings.

Operation Example 1

Figure 3:
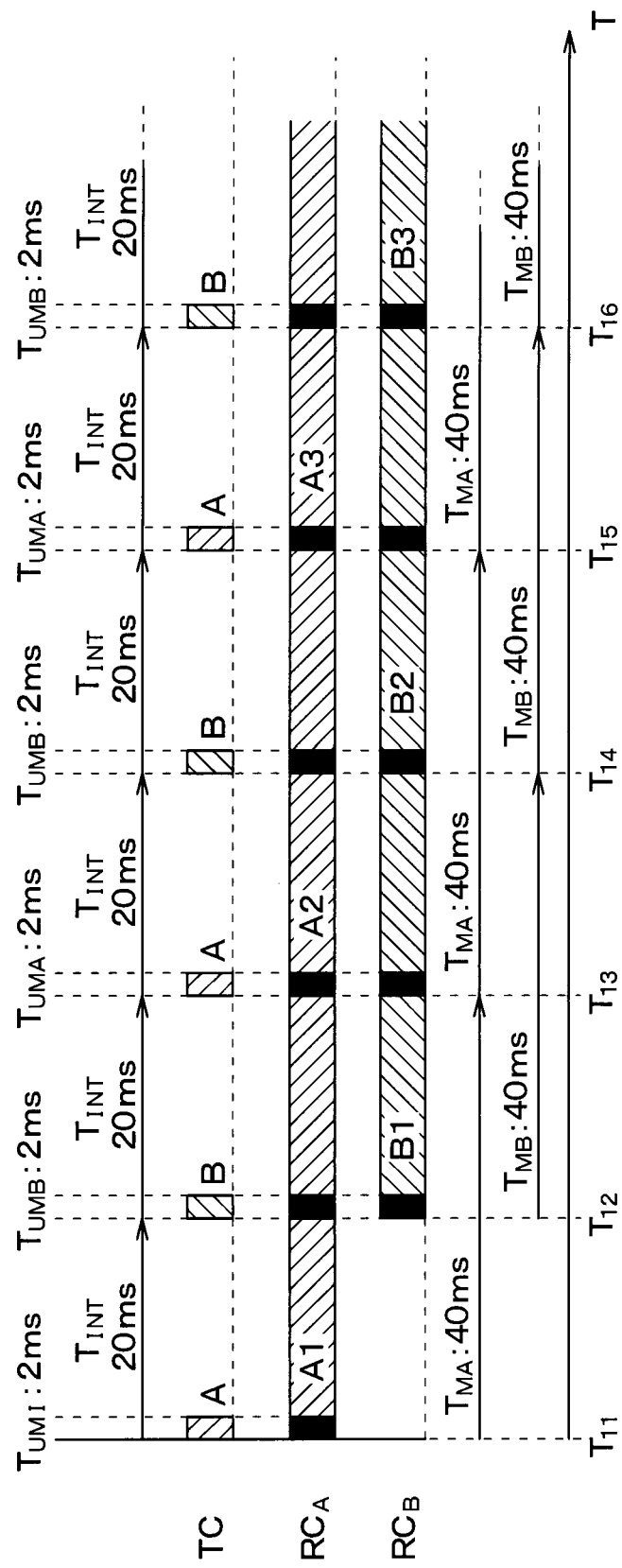
FIG. 3 is a timing chart showing an example of operation of the object detection device shown in FIG. 1.
Figure 4:
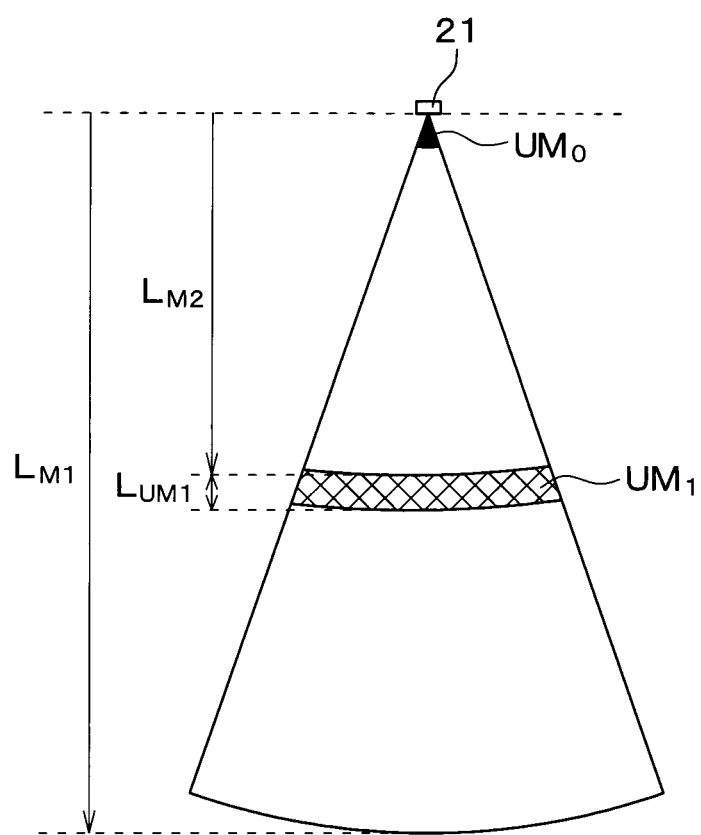
FIG. 4 is a conceptual diagram corresponding to the timing chart shown in FIG. 3.

FIGS. 3 and 4 show an example of operation in which the first search wave and the second search wave are alternately transmitted at equal intervals. In FIG. 3, the horizontal axis T indicates time, "TC" indicates transmission control, and "RC" indicates reception control. In transmission control and reception control, "A" indicates first drive signals and "B" indicates second drive signals.

The relationship between the measurement time $T_M$ and the detection distance $L_M$ can be represented by $T_M=2 \cdot L_M/c$ (c represents the speed of sound). The measurement time $T_M$ approximately corresponds to the transmission period/cycle of the search wave. The detection distance $L_M$ corresponds to the farthest distance at which an object B can be detected.

In a situation where the host vehicle and the object B to be detected are moving relatively with each other, there is demand to increase the frequency of object detection by reducing the measurement time $T_M$ once the object B is detected. However, if the measurement time $T_M$ is reduced, it becomes impossible to detect other distant obstacles. In addition, if the measurement time $T_M$ is erroneously reduced due to noise, it becomes impossible to detect other distant obstacles until the measurement time $T_M$ returns to the mode for detection of long distance range. Thus, there has been a significant technical problem in achieving both favorable detection accuracy and detection period of the object B.

In this respect, in the present embodiment, the drive signal generation unit 3 generates a first drive signal corresponding to a first search wave and a second drive signal corresponding to a second search wave which has an encoding scheme that is different from that of the first search wave. The control unit 4 causes the drive signal generation unit 3 to output the first drive signal and the second drive signal at different timings to the transmitter so that one of the first and second search waves is transmitted in a transmission interval between transmissions of the other search wave. Typically, the first and second drive signals have the same signal duration and different output start timings. The transceiver 2 transmits the first search wave when the first drive signal is input, and transmits the second search wave when the second drive signal is input.

Specifically, as shown in FIG. 3, in this operation example, the first search wave is transmitted at intervals of measurement time $T_{MA}$=40 ms. As a result, detection distance $L_{M1}$=about 6.8 m can be secured. Similarly, the second search wave is transmitted at intervals of measurement time $T_{MB}$=40 ms. As a result, a detection distance $L_{M1}$=about 6.8 m can be secured. The measurement time $T_{MA}$ and $T_{MB}$ are the same and constant. On the other hand, the first and second search waves are alternately transmitted at intervals of $T_{INT}$=20 ms. That is, $T_{INT}$ is the time interval from the transmission timing of the first search wave to the transmission timing of the second search wave immediately following. $T_{INT}$ is also the time interval from the transmission timing of the second search wave to the transmission timing of the first search wave immediately following. "Transmission timing" typically refers to the timing of transmission start. In this case, the object detection cycle coincides with the time interval $T_{INT}$=20 ms at which different types of search waves that are adjacent in time are transmitted. Therefore, the object detection frequency is doubled as compared with a case where only the first or second search wave is used.

Thus, in the configuration of the present embodiment, the drive signal generation unit 3 outputs the first drive signal and the second drive signal to the transmitter at different timings under the control of the control unit 4. Thus, one of the first and second search waves having different encoding schemes is transmitted in a transmission interval between transmissions of the other search wave. Therefore, it is possible to provide an object detection device 1 that can reduce the object detection period as much as possible for both the short-distance range and the long-distance range with a simpler device configuration.

In this embodiment, the transceiver 2 can function as a transmitter and a reception unit. That is, the transceiver 2 includes a transmitter and a transducer 21 which is a transmitter and a transceiver. Therefore, the transceiver 2 transmits the first search wave and the second search wave and receives the reflected waves using the transducer 21 to generate received signals corresponding to the distance to the object B.

As described above, in the present embodiment, each of the search waves is formed so that they are modulated differently with respect to the fundamental wave having a constant frequency. Therefore, it is possible to realize a device capable of transmitting a plurality of search waves that can be distinguished from each other with a simple configuration including a transceiver 2 provided with a single transducer 21 combining a transmitter and a reception unit.

Now, an undetectable time $T_{UM}$ shown in FIG. 3 and an undetectable zone UM shown in FIG. 4 will be described. The undetectable time $T_{UM}$ is a time period during which the object B cannot be detected due to reverberation in the transducer 21. Specifically, the undetectable time $T_{UM}$ is a time period during which the transducer 21 cannot receive reflected waves. The undetectable zone UM is an area in which the object B cannot be detected due to the occurrence of the undetectable time $T_{UM}$.

Referring to FIG. 3, transmission and reception control starts at time Tu. Then, first, at time $T_{11}$, the first, first drive signal is input. As a result, a first search wave is transmitted from the transducer 21. The first-search-wave reception control A1 for the first transmission of the first search wave starts at time $T_{11}$, and ends at time $T_{11}$ which is measurement time period $T_{MA}$ after time $T_{13}$. At time $T_{12}$, which is in the middle of this first, first-search-wave reception control A1, the first second drive signal is input. As a result, a second search wave is transmitted from the transducer 21. The time $T_{12}$ is 20 ms after the first transmission start time $T_{11}$ of the first search wave.

However, even when the input of the drive signal is terminated, reverberation is generated in the transducer 21 after that. Therefore, there is an undetectable time $T_{UM}$ that lasts for a predetermined time from the start of input of the drive signal. In the example of FIG. 3, the signal length of the drive signal is about 1 ms or less, and the undetectable time $T_{UM}$ is about 2 ms.

Therefore, in the first-search-wave reception control A1 in the first cycle, the undetectable time $T_{UM}$ occurs twice. Specifically, first, there would be the undetectable time $T_{UMI}$ generated due to the first transmission of the first search wave, lasting for 2 ms from time point $T_1$. In addition, there would be the undetectable time $T_{UMB}$ generated due to the first transmission of the second search wave, lasting for 2 ms from time point $T_{12}$ which is 20 ms after time point $T_{11}$.

As such, there are two undetectable time $T_{UM}$ during the measurement time $T_{MA}$=40 ms starting from time point $T_{11}$. The relationship between this and the detection range shown in FIG. 4 is as follows. That is, an undetectable zone $UM_0$ is generated at the position closest to the transducer 21. The undetectable zone $UM_0$ corresponds to the undetectable time $T_{UMI}$. The length of the undetectable zone $UM_0$ in the distance measuring direction is about 0.35 m. A length in the distance measuring direction is the length along the transmitting direction of the search wave from the transducer 21. Further, there will be an undetectable zone $UM_1$ at a position that is a predetermined distance $L_{M2}$ away from the transducer 21. The undetectable zone $UM_1$ corresponds to the undetectable time $T_{UMB}$. The predetermined distance $L_{M2}$ is $L_{M2}=L_{M1}/2$=about 3.4 m. The width $L_{UM1}$ of the undetectable zone $UM_1$, that is, its length in the distance measuring direction is about 0.35 m.

Similarly, the second-search-wave reception control B1 for the first transmission of the second search wave starts at time point $T_{12}$ and ends at time point $T_{14}$ which is measurement time $T_{MB}$ after time point $T_{12}$. At time point $T_{13}$ which is in the middle of this first second-search-wave reception control B1, the first drive signal is input in the second cycle. As a result, a first search wave is transmitted from the transducer 21. Time point $T_{13}$ is 40 ms after the transmission start time $T_{11}$ of the first, first search wave, and 20 ms after the transmission start time $T_{12}$ of the first second search wave.

Therefore, also in the second-search-wave reception control B1 in the first cycle, the undetectable time $T_{UM}$ occurs twice. Specifically, first, there would be the undetectable time $T_{UMB}$ generated due to the first transmission of the second search wave, lasting for 2 ms from time point $T_{12}$. In addition, there would be the undetectable time $T_{UMA}$ generated due to the second transmission of the first search wave, lasting for 2 ms from time point $T_{13}$ which is 20 ms after time point $T_{12}$.

As such, there are also two undetectable time $T_{UM}$ during the measurement time $T_{MB}$=40 ms starting from time point $T_{12}$. The relationship between this and the detection range shown in FIG. 4 is as follows. That is, the undetectable zone $UM_0$ which is adjacent to the transducer 21 corresponds to the undetectable time $T_{UMB}$. Further, the undetectable zone $UM_1$ which is a predetermined distance $L_{M2}$ away from the transducer 21 corresponds to the undetectable time $T_{UMA}$. The undetectable time $T_{UMA}$ generated due to the transmission of the first search wave, and the undetectable time $T_{UMB}$ generated due to the transmission of the second search wave have the same duration.

Similarly, also in the first-search-wave reception control A2 in the second cycle, there are two undetectable time $T_{UMA}$ and $T_{UMB}$. The undetectable time $T_{UMA}$ associated with the transmission of the first search wave and the undetectable time $T_{UMI}$ immediately after the start of transmission/reception control have the same duration. The undetectable zone $UM_0$ which is adjacent to the transducer 21 corresponds to the undetectable time $T_{UMA}$. Further, the undetectable zone $UM_1$ which is a predetermined distance $L_{M2}$ away from the transducer 21 corresponds to the undetectable time $T_{UMB}$.

As described above, in this operation example, an undetectable zone $UM_1$ different from the undetectable zone $UM_0$ adjacent to the transducer 21 would be generated at a certain distance from the transducer 21. Normally, the host vehicle and the object B are moving relative to each other during the object detection operation. Therefore, it is unlikely that the object B stays in the undetectable zone $UM_1$ for a long time. Accordingly, even if an undetectable zone UM that is different from the undetectable zone $UM_0$ adjacent to the transducer 21 is constantly at the same position, there is no particular hindrance in the obstacle detection or driving control of the host vehicle.

However, there may be a situation where it is preferable that the position of the undetectable zone UM that is different from the undetectable zone $UM_0$ adjacent to the transducer 21 changes with time. Next, an operation example in which the position of the undetectable zone UM fluctuates with time will be described.

Operation Example 2

Figure 5:
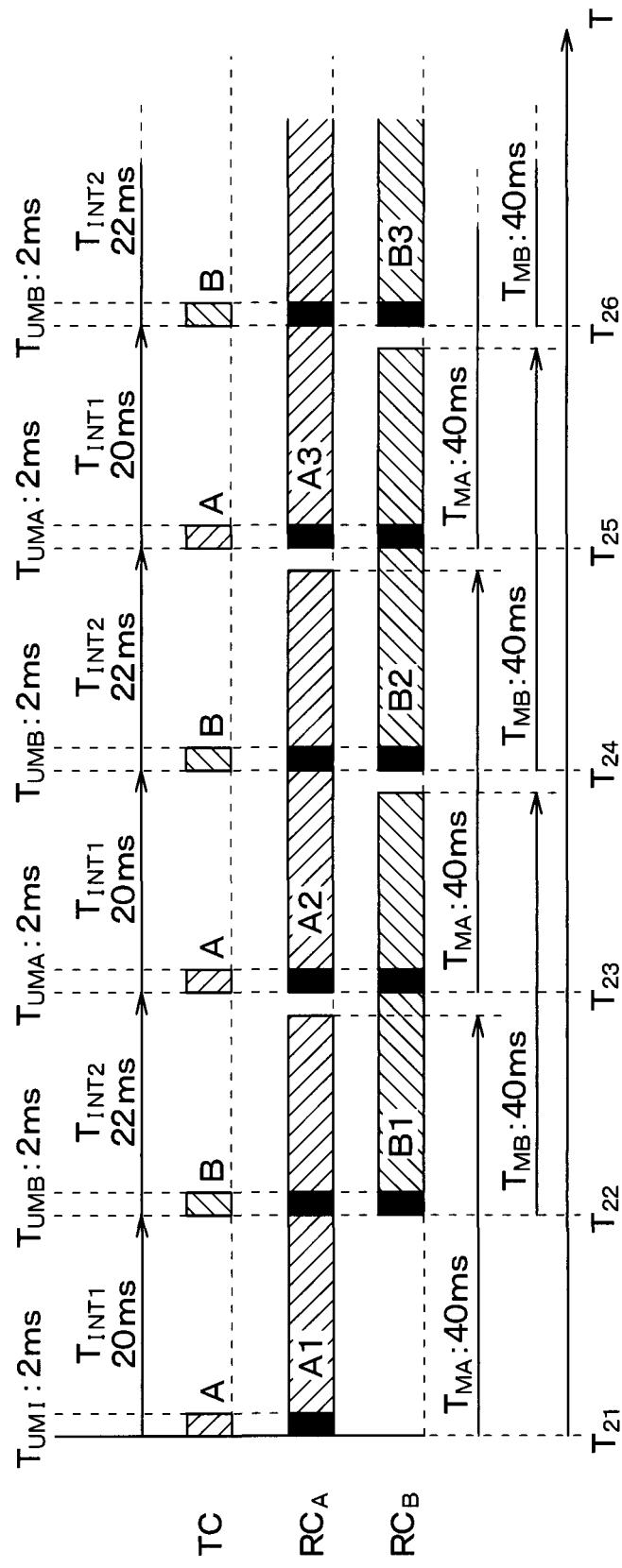
FIG. 5 is a timing chart showing another operation example of the object detection device shown in FIG. 1.
Figure 6:
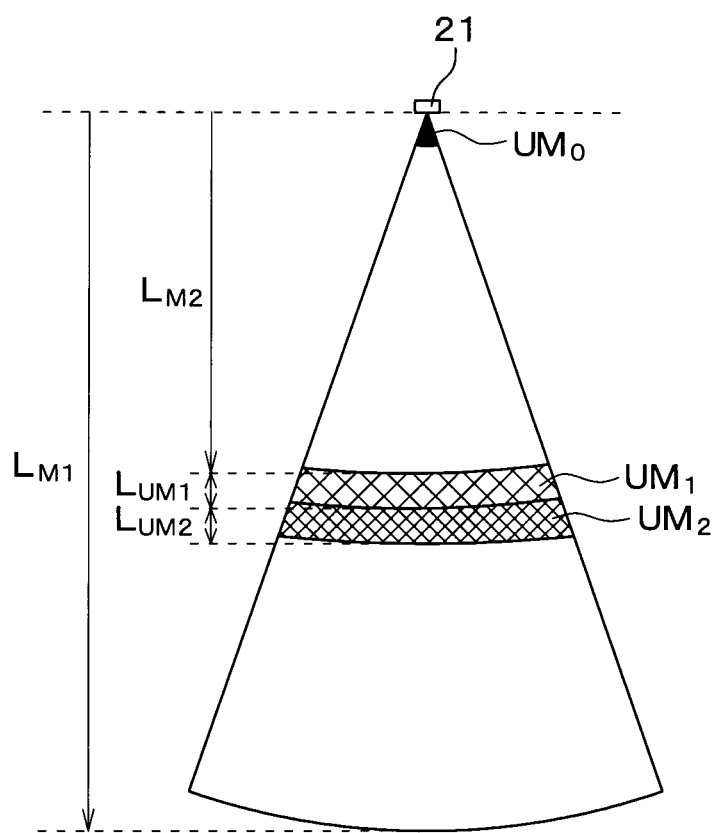
FIG. 6 is a conceptual diagram corresponding to the timing chart shown in FIG. 5.

FIGS. 5 and 6 show an example in which the measurement time $T_{MA}$ and $T_{MB}$ are the same and constant, but a first-time interval $T_{INT1}$ and a second-time interval $T_{INT2}$ are different. That is, in this operation example, the control unit 4 causes the drive signal generation unit 3 to output the first drive signal and the second drive signal so that the first-time interval $T_{INT1}$ and the second-time interval $T_{INT2}$ are different. The first-time interval $T_{INT1}$ is the time interval from the transmission timing of the first search wave to the transmission timing of the second search wave immediately following. The second-time interval $T_{INT2}$ is the time interval from the transmission timing of the second search wave to the transmission timing of the first search wave immediately following. The first-time interval $T_{INT1}$ and the second-time interval $T_{INT2}$ are adjacent to each other in time.

Making the first-time interval $T_{INT1}$ and the second-time interval $T_{INT2}$ different from each other leads to the position of the undetectable zone UM that is different from the undetectable zone $UM_0$ adjacent to the transducer 21 fluctuating with time. As a result, occurrence of problems in object detection due to the undetectable zone UM can be properly suppressed.

In the example shown in FIGS. 5 and 6, the second-time interval $T_{INT2}$ is longer than the first-time interval $T_{INT1}$. Specifically, in this example, the difference $\Delta T$ between the first-time interval $T_{INT1}$ and the second-time interval $T_{INT2}$ is the same as the undetectable time $T_{UMA}$ and $T_{UMB}$, that is, 2 ms.

Referring to FIG. 5, transmission/reception control starts at time $T_{21}$. Then, the first search wave is transmitted at intervals of measurement time $T_{MA}$=40 ms. In addition, the second search wave is transmitted at intervals of measurement time $T_{MB}$=40 ms. The first search wave and the second search wave are transmitted alternately.

In the first-search-wave reception control A1 in the first cycle, there are two undetectable time $T_{UM}$. Specifically, first, there would be the undetectable time $T_{UMI}$ generated due to the first transmission of the first search wave, lasting for 2 ms from time point $T_{21}$. In addition, there would be the undetectable time $T_{UMB}$ generated due to the first transmission of the second search wave, lasting for 2 ms from time point $T_{22}$ which is 20 ms after time point $T_{21}$.

As such, there are two undetectable time $T_{UM}$ during the measurement time $T_{MA}$=40 ms starting from time point $T_{21}$. The relationship between this and the detection range shown in FIG. 6 is as follows. That is, the undetectable zone $UM_0$ which is adjacent to the transducer 21 corresponds to the undetectable time $T_{UMI}$. Further, the undetectable zone $UM_1$ which is a predetermined distance $L_{M2}$ away from the transducer 21 corresponds to the undetectable time $T_{UMB}$.

In addition, in the second-search-wave reception control B1 in the first cycle, the undetectable time $T_{UM}$ occurs twice. Specifically, first, there would be the undetectable time $T_{UMB}$ generated due to the first transmission of the second search wave, lasting for 2 ms from time point $T_{22}$. In addition, there would be the undetectable time $T_{UMA}$ generated due to the second transmission of the first search wave, lasting for 2 ms from time point $T_{23}$ which is 22 ms after time point $T_{22}$. This undetectable time $T_{UMA}$ occurs after the end of the reception control A1 for the first, first search wave.

As such, there are also two undetectable time $T_{UM}$ during the measurement time $T_{MB}$=40 ms starting from time point $T_{22}$. The relationship between this and the detection range shown in FIG. 6 is as follows. That is, the undetectable zone $UM_0$ which is adjacent to the transducer 21 corresponds to the undetectable time $T_{UMB}$. An undetectable zone $UM_2$ corresponding to the undetectable time $T_{UMA}$ is generated a predetermined distance "$L_{M2}+L_{UM1}$" away from the transducer 21. That is, the undetectable zone $UM_2$ is further than the undetectable zone $UM_1$ by $L_{UM1}$. The undetectable zones $UM_1$ and $UM_2$ adjoin each other at an arcuate boundary line, but do not overlap with each other.

As described above, in this operation example, undetectable zones $UM_1$ and $UM_2$ which do not overlap with each other are alternately generated at some distances from the undetectable zone $UM_0$ adjacent to the transducer 21. This makes it possible to satisfactorily disperse the undetectable zone UM generated at some distance from the undetectable zone $UM_0$ adjacent to the transducer 21.

Note that the difference $\Delta T$ between the first-time interval $T_{INT1}$ and the second-time interval $T_{INT2}$ does not have to be the same value as the undetectable time $T_{UM}$. That is, $\Delta T$ may equal to or greater than the undetectable time $T_{UM}$. In this case, the control unit 4 causes the drive signal generation unit 3 to output the first drive signal and the second drive signal so that $\Delta T$ is equal to or greater than the undetectable time $T_{UM}$. As a result, it is possible to avoid overlap between the undetectable zones $UM_1$ $UM_2$.

Operation Example 3

Figure 7:
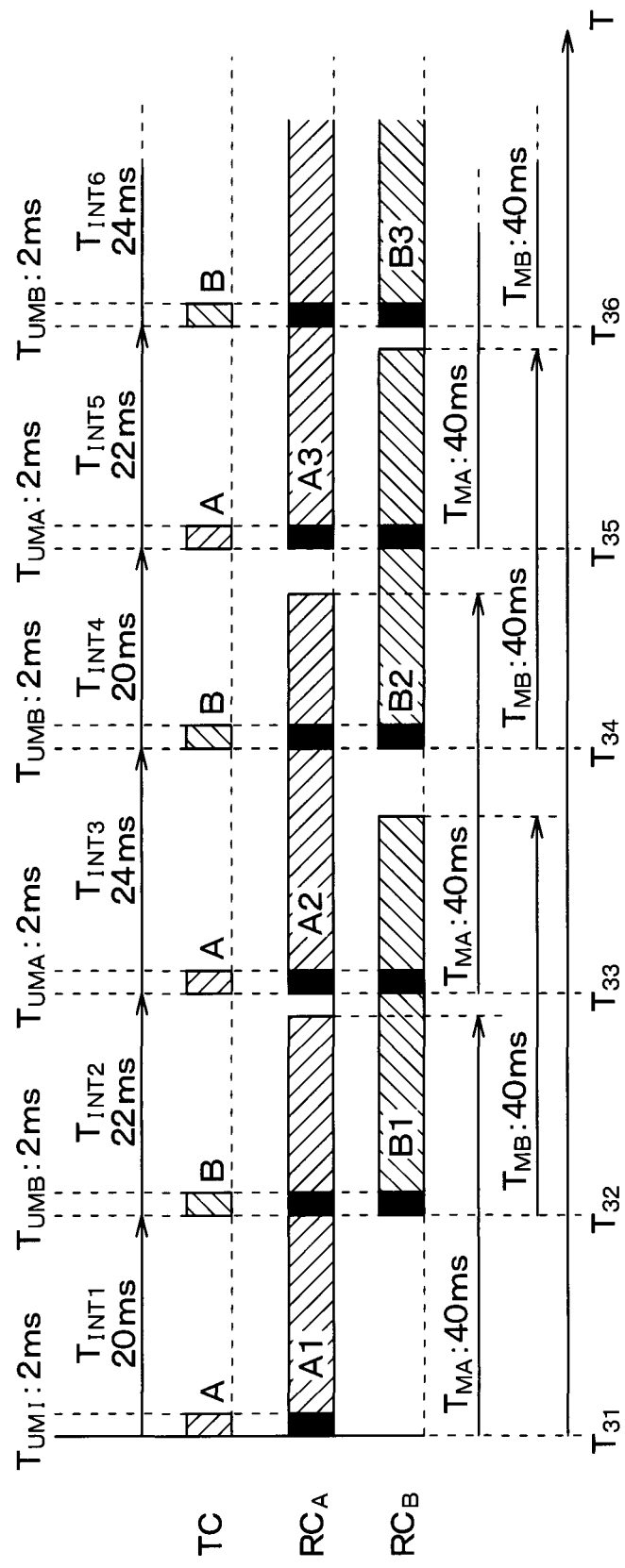
FIG. 7 is a timing chart showing another operation example of the object detection device shown in FIG. 1.
Figure 8:
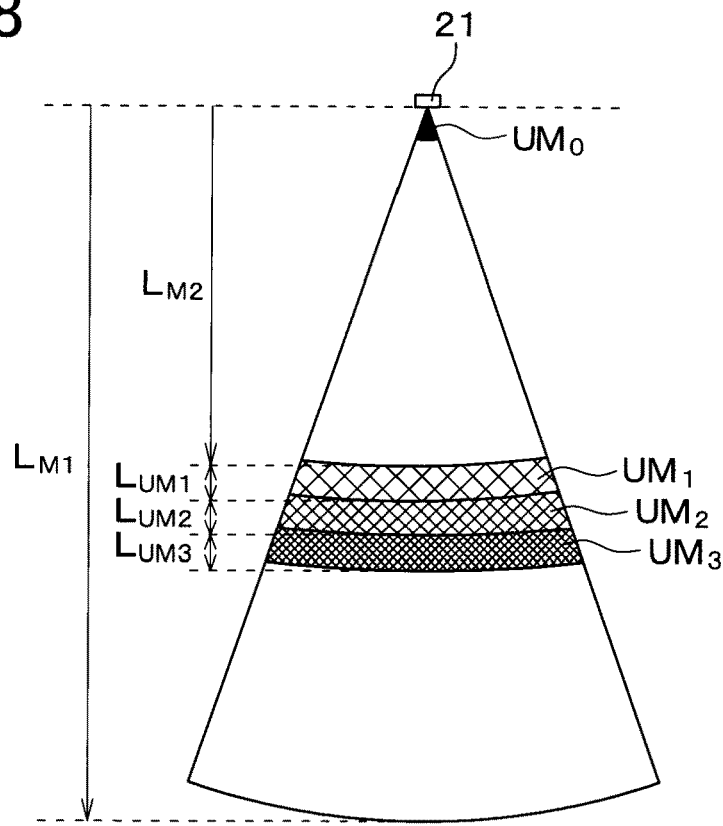
FIG. 8 is a conceptual diagram corresponding to the timing chart shown in FIG. 7.

FIGS. 7 and 8 show a case where the time intervals $T_{INT}$ between transmissions of different kinds of search waves adjacent in time changes more finely than the example of FIGS. 5 and 6. In this operation example, three kinds of time intervals $T_{INT}$ different from each other are periodically applied. That is, a first-time interval $T_{INT1}$, a second-time interval $T_{INT2}$, and a third time interval $T_{INT3}$, which are different from each other, are applied sequentially. Similarly, a fourth time interval $T_{INT4}$, a fifth time interval $T_{INT5}$, and a sixth time interval $T_{INT6}$, which are different from each other, are applied sequentially. $T_{INT1}=T_{INT4}$, $T_{INT2}=T_{INT5}$, and $T_{INT3}=T_{INT6}$ hold. Specifically, $T_{INTp}$=20 ms where p=3n-2. $T_{INTq}$=22 ms where q=3n-1. $T_{INTr}$=24 ms where r=3n. n is a natural number. Note that, also in this operation example, the measurement time $T_{MA}$ and $T_{MB}$ are the same and constant.

In other words, in this operation example, the time interval $T_{INTX}$ and the time interval $T_{INTY}$ are different. X is an odd natural number (i.e., 1, 3, 5 . . . ). Y is an even natural number (i.e., 2, 4, 6 . . . ). The time interval $T_{INTX}$ is the time interval from the transmission timing of the first search wave to the transmission timing of the second search wave immediately following. The time interval $T_{INTY}$ is the time interval from the transmission timing of the second search wave to the transmission timing of the first search wave immediately following. The time interval $T_{INTX}$ and the time interval $T_{INTY}$ are adjacent to each other in time. This is similar to the example of FIGS. 5 and 6.

On the other hand, in this operation example, time intervals $T_{INTX}$ that are adjacent to each other in time are different from each other. Similarly, time intervals $T_{INTY}$ adjacent to each other in time are different from each other. That is, the control unit 4 causes the drive signal generation unit 3 to output the first drive signal and the second drive signal so that a preceding time interval and a succeeding time interval are different. A preceding time interval is the time interval from the transmission timing of the first search wave for the current cycle to the transmission timing of the second search wave immediately following. A succeeding time interval is the time interval from the transmission timing of the first search wave for the next cycle to the transmission timing of the second search wave immediately following.

The difference between the preceding time interval and the succeeding time interval is equal to or greater than the undetectable time $T_{UM}$. That is, the control unit 4 causes the drive signal generation unit 3 to output the first drive signal and the second drive signal so that the difference between the preceding time interval and the succeeding time interval is equal to or greater than the undetectable time $T_{UM}$. Specifically, the third time interval $T_{INT3}$ is longer than the first-time interval $T_{INT1}$, and the difference between them is twice the undetectable time $T_{UM}$, i.e., 4 ms. On the other hand, the fifth time interval $T_{INT5}$ is shorter than the third time interval $T_{INT3}$, and the difference between them is the same as the undetectable time $T_{UM}$, i.e., 2 ms. The seventh time interval $T_{INT7}$ is shorter than the fifth time interval $T_{INT5}$, and the difference between them is the same as the undetectable time $T_{UM}$, i.e., 2 ms. For the sake of simplicity, the seventh time interval $T_{INT7}$=20 ms is not shown in the figure.

Similarly, the fourth time interval $T_{INT4}$ is shorter than the second-time interval $T_{INT2}$, and the difference between them is the same as the undetectable time $T_{UM}$, i.e., 2 ms. On the other hand, the sixth time interval $T_{INT6}$ is longer than the fourth time interval $T_{INT4}$, and the difference $\Delta T$ between them is twice the undetectable time $T_{UM}$, i.e., 4 ms. The eighth time interval $T_{INT8}$ is shorter than the sixth time interval $T_{INT6}$, and the difference between them is the same as the undetectable time $T_{UM}$, i.e., 2 ms. For the sake of simplicity, the eighth time interval $T_{INT8=22}$ ms is not shown in the figure.

Further, in this operation example, the difference $\Delta T$ between the time interval $T_{INTk}$ and the time interval $T_{INTk+1}$, which are adjacent to each other in time, is equal to or larger than the undetectable time $T_{UM}$. k is a natural number. Specifically, the second-time interval $T_{INT2}$ is longer than the first-time interval $T_{INT1}$, and the difference $\Delta T$ between them is the same as the undetectable time $T_{UM}$, i.e., 2 ms. Similarly, the third time interval $T_{INT3}$ is longer than the second-time interval $T_{INT2}$, and the difference $\Delta T$ between them is the same as the undetectable time $T_{UM}$, i.e., 2 ms. On the other hand, the fourth time interval $T_{INT4}$ is shorter than the third time interval $T_{INT3}$, and the difference $\Delta T$ between them is twice the undetectable time $T_{UM}$, i.e., 4 ms.

Referring to FIG. 7, transmission/reception control starts at time $T_{31}$. Then, the first search wave is transmitted at intervals of measurement time $T_{MA}$=40 ms. In addition, the second search wave is transmitted at intervals of measurement time $T_{MB}$=40 ms. The first search wave and the second search wave are transmitted alternately.

In the first-search-wave reception control A1 in the first cycle, there are two undetectable time $T_{UM}$. Specifically, first, there would be the undetectable time $T_{UMI}$ generated due to the first transmission of the first search wave, lasting for 2 ms from time point $T_{31}$. In addition, there would be the undetectable time $T_{UMB}$ generated due to the first transmission of the second search wave, lasting for 2 ms from time point $T_{32}$ which is 20 ms after time point $T_{31}$.

In addition, in the second-search-wave reception control B1 in the first cycle, the undetectable time $T_{UM}$ occurs twice. Specifically, first, there would be the undetectable time $T_{UMB}$ generated due to the first transmission of the second search wave, lasting for 2 ms from time point $T_{32}$. In addition, there would be the undetectable time $T_{UMA}$ generated due to the second transmission of the first search wave, lasting for 2 ms from time point $T_{33}$ which is 22 ms after time point $T_{32}$. This undetectable time $T_{UMA}$ occurs after the end of the reception control A1 for the first, first search wave. Further, there would be the undetectable time $T_{UMB}$ generated due to the second transmission of the second search wave, lasting for 2 ms from time point $T_{34}$ which is 24 ms after time point $T_{33}$.

Further, also in the first-search-wave reception control A2 in the second cycle, the undetectable time $T_{UM}$ occurs twice. Specifically, first, there would be the undetectable time $T_{UMA}$ generated due to the second transmission of the first search wave, lasting for 2 ms from time point $T_{33}$. In addition, there would be the undetectable time $T_{UMB}$ generated due to the second transmission of the second search wave, lasting for 2 ms from time point $T_{34}$ which is 24 ms after time point $T_{33}$.

The relationship between these and the detection range shown in FIG. 8 is as follows. That is, the undetectable zone $UM_0$ which is adjacent to the transducer 21 corresponds to the undetectable time $T_{UMI}$. Further, the undetectable zone $UM_1$ which is a predetermined distance $L_{M2}$ away from the transducer 21 corresponds to the undetectable time $T_{UMB}$ at time point $T_{32}$. The undetectable zone $UM_2$ corresponding to the undetectable time $T_{UMA}$ at time point $T_{33}$ is generated at a predetermined distance of "$L_{M2}+L_{UM1}$" from the transducer 21. That is, the undetectable zone $UM_2$ is further than the undetectable zone $UM_1$ by $L_{UM1}$. The undetectable zones $UM_1$ and $UM_2$ adjoin each other at an arcuate boundary line, but do not overlap with each other. The width $L_{UM2}$ of the undetectable zone $UM_2$ is about 0.35 m, which is the same as the width $L_{UM1}$ of the undetectable zone $UM_1$.

Further, the undetectable zone $UM_3$ corresponding to the undetectable time $T_{UMB}$ at time point $T_{34}$ is generated at a predetermined distance of "$L_{M2}+L_{UM1}+L_{UM2}$" from the transducer 21. That is, the undetectable zone $UM_3$ is further than the undetectable zone $UM_2$ by $L_{UM2}$. The undetectable zones $UM_2$ and $UM_3$ adjoin each other at an arcuate boundary line, but do not overlap with each other. The width $L_{UM3}$ of the undetectable zone $UM_3$ is about 0.35 m, which is the same as the width $L_{UM1}$ of the undetectable zone $UM_1$ and the width $L_{UM2}$ of the undetectable zone $UM_2$.

As described above, in this operation example, undetectable zones $UM_1$, $UM_2$, and $UM_3$ which do not overlap with each other are generated in order at some distances from the undetectable zone $UM_0$ adjacent to the transducer 21. This makes it possible to satisfactorily disperse the undetectable zone UM generated at some distance from the undetectable zone $UM_0$ adjacent to the transducer 21.

Modifications

The present disclosure is not limited to the above embodiments. Therefore, the above embodiments can be modified as appropriate. Typical modified examples will be described below. In the following description of the modified examples, the differences from the above embodiment will be mainly discussed. Further, the same or equivalent parts of the above-described embodiment and the modified examples are designated by the same reference symbols. Therefore, in the following description of the modified examples, regarding the components having the same reference signs as those of the above embodiment, the description given in connection with the above embodiment can be applied as appropriate unless there is technical contradiction or particular additional mention.

The object detection device 1 is not limited to a vehicle-mounted device, that is, a device mounted on a vehicle. For example, the object detection device 1 may be mounted on a ship or an air vehicle.

The object detection device 1 is not limited to a configuration in which ultrasonic waves can be transmitted and received by a single transducer 21. That is, for example, a transmitting transducer 21 electrically connected to the transmitting circuit 22 and a receiving transducer 21 electrically connected to the reception circuit 23 may be provided in parallel. Since the sound waves transmitted by the transmitting transducer 21 are directly received by the receiving transducer 21 in such a transmission/reception-separated configuration, an undetectable zone is generated as in the transmission/reception-integrated configuration. The time point $T_{delay}$ of the undetectable zone is $T_{delay}=L_{GAP}/c$, where $L_{GAP}$ is the distance between the transmitting transducer 21 and the receiving transducer 21.

In addition, since a large amount of electric power is used to transmit a sound wave, voltage fluctuations and current fluctuations may occur in the power supply line. An undetectable zone may also occur as a result of these fluctuations being amplified on the receiver side and appearing in the received signal. As such, the present disclosure is also applicable to transmission/reception-separated configurations because undetectable zones appear in such configurations as well.

The examples of the first and second drive signals when the first and second search waves have different chirp-encoding schemes are not limited to the specific examples shown in FIGS. 2A and 2B. That is, for example, the waveforms of the specific examples shown in FIGS. 2A and 2B can be changed as appropriate.

Further, one of the first and second search waves may not be chirp-encoded. That is, for example, the first search wave may have up-chirp modulation or down-chirp modulation, and the second search wave may have a constant frequency. The constant frequency in such a case is typically a frequency that substantially coincides with the resonance frequency or a frequency near the resonance frequency. A frequency "near" the resonance frequency is, for example, a frequency within a predetermined frequency range that is centered on the reference value of the resonance frequency. The reference value is the resonance frequency at a certain reference temperature (for example, 25° C.). The predetermined frequency range is a frequency fluctuation range for taking into account some fluctuation of the environmental temperature from the reference temperature.

The encoding is not limited to chirp encoding. For example, it may be encoding that uses phase modulation. That is, the drive signal generation unit 3 may be configured to generate a plurality of drive signals so as to cause a plurality of search waves to be produced in different phase-modulated states.

Figure 9A:
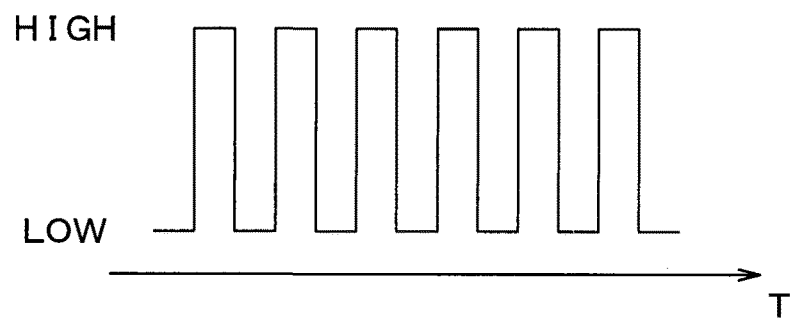
FIG. 9A is a graph showing another example of a drive signal output by the drive signal generation unit shown in FIG. 1.
Figure 9B:
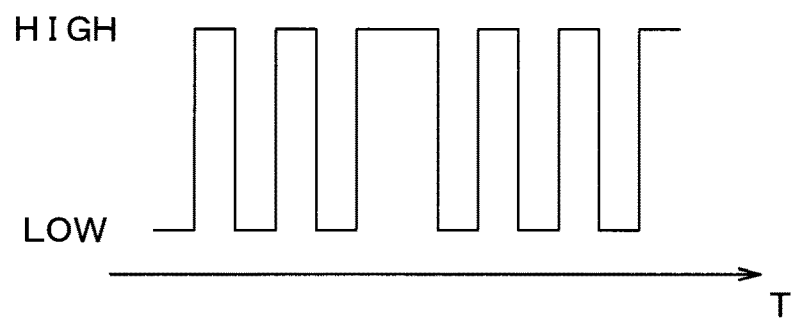
FIG. 9B is a graph showing another example of a drive signal output by the drive signal generation unit shown in FIG. 1.

FIGS. 9A and 9B show an example in which the first search wave and the second search wave have different phase-modulated states. In this example, the first search wave is not phase-modulated. On the other hand, the second search wave is phase-modulated. In accordance with this, the first drive signal does not have a phase-modulated part as shown in FIG. 9A. On the other hand, the second drive signal has a phase-modulated part as shown in FIG. 9B. In such a configuration, the drive signal generation unit 3 generates the first drive signal and the second drive signal so that the first search wave and the second search wave have different phase-modulated states.

Alternatively, the encoding may be one that uses on-off keying. That is, the drive signal generation unit 3 may be configured to generate a plurality of drive signals to cause a plurality of search waves oscillate in different on-off-modulated states.

Figure 10A:
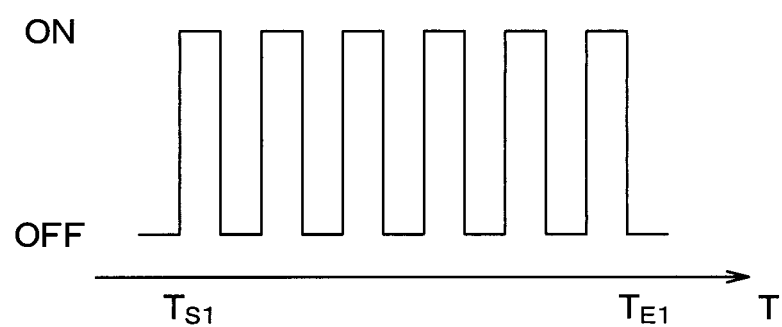
FIG. 10A is a graph showing another example of a drive signal output by the drive signal generation unit shown in FIG. 1.
Figure 10B:
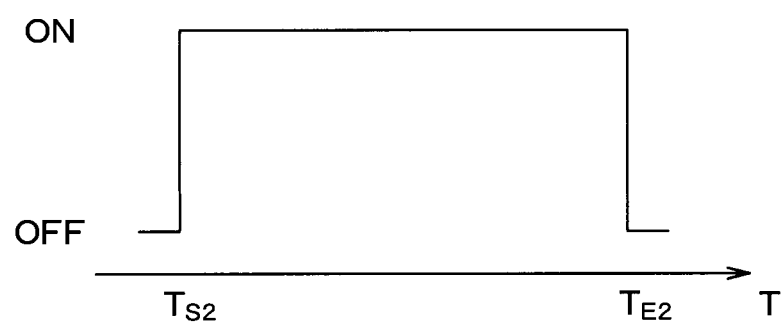
FIG. 10B is a graph showing another example of a drive signal output by the drive signal generation unit shown in FIG. 1.

FIGS. 10A and 10B show an example in which the first search wave and the second search wave have different on-off-modulated states. In such a configuration, the drive signal generation unit 3 generates the first drive signal and the second drive signal so that the first search wave and the second search wave have different on-off-modulated states.

In this example, the first search wave is on-off-modulated. In accordance with this, as shown in FIG. 10A, excitation of the first drive signal at the resonance frequency is turned on and off many times from the transmission start time point $T_{S1}$ to the transmission end time point TEL of the first search wave. On the other hand, the second search wave is not on-off-modulated. In accordance with this, as shown in FIG. 10B, excitation of the second drive signal at the resonance frequency is continuously carried out between the transmission start time point $T_{S2}$ and the transmission end time point $T_{E2}$ of the second search wave.

The undetectable time $T_{UMA}$ generated due to the transmission of the first search wave may differ from the undetectable time $T_{UMB}$ generated due to the transmission of the second search wave.

In the specific embodiments described above, the time interval $T_{INT}$ between transmissions of different kinds of search waves that are adjacent to each other in time was about half the measurement time period $T_M$. However, the present disclosure is not limited to such mode. That is, for example, the time interval $T_{INT}$ may be about ⅓ of the measurement time period $T_M$.

Alternatively, the time interval $T_{INT}$ may have a numerical value that cannot be represented by G/H of the measurement time period $T_M$. G and H are natural numbers from 1 to 9. Specifically, for example, when the measurement time period $T_M$=40 ms, the time interval $T_{INT}$ may be 13 ms. In this case, three or more types of search waves and corresponding drive signals are required.

In a configuration in which the computing power of the control unit 4 and/or the transceiver 2 is low, measurement processing and signal processing cannot be executed simultaneously. Therefore, in such a configuration, in addition to the measurement time $T_M$, extra time is required, such as processing time $T_{Proc}$ for processing the received signal. For example, it is assumed that signal processing corresponding to this processing time $T_{Proc}$ is performed after the measurement time period $T_{MA}$=40 ms of the first search wave, and the transmission start time point of the second wave is 20 ms after the first transmission start time point $T_{11}$ of the first search wave. In this case, to carry out the measurement processing for the first search wave, the measurement time period $T_{MB}$ of the second search wave is terminated after 20 ms. In this case, the range from 0 to 3.4 m corresponding to 20 ms is measured in both measurement rounds, and the range from 3.4 to 6.8 m corresponding to the measurement time period from 20 ms to 40 ms is measured in one of the two rounds. The present disclosure is also applicable to this configuration.

The configurations of the components such as the transmission circuit 22 and the reception circuit 23 are also not limited to the specific examples described in the above embodiments. That is, for example, the digital/analog conversion circuit may be provided in the drive signal generation unit 3 instead of the transmission circuit 22.

It goes without saying that the components of the above-described embodiments are not necessarily essential unless expressly stated otherwise or it is considered to be obviously essential in principle, etc. In addition, when a numerical value such as the number, value, amount, or range of a component(s) is mentioned, the present disclosure is not limited to the particular number unless expressly stated otherwise or it is obviously limited to the particular number in principle, etc. Similarly, when the shape, direction, positional relationship, or the like of a component or the like is mentioned, the present disclosure is not limited to the shape, direction, positional relationship, or the like unless explicitly stated otherwise or it is limited to the specific shape, direction, positional relationship, or the like in principle, etc.

Modified examples are not limited to the above examples. A plurality of modified examples can be combined with each other. Further, all or a part of one or more of the above-described embodiments may be combined with all or a part of one or more of the modified examples.

What is claimed is:

1. An object detection device configured to detect a surrounding object, comprising:
a drive signal generation unit provided to generate a drive signal for driving a transmitter including a transmitter for externally transmitting search waves; and
a control unit provided to control output of the drive signal from the drive signal generation unit to the transmitter, wherein
the drive signal generation unit generates a first drive signal corresponding to a first search wave and a second drive signal corresponding to a second search wave having an encoding scheme that is different from the encoding scheme of the first search wave, and
the control unit causes the drive signal generation unit to output the first drive signal and the second drive signal to the transmitter at different timings at which
a start of transmission of the second search wave begins during transmission of the first search wave of a current cycle, wherein a cycle is defined as transmission of a first search wave and a second search wave, and
a start of transmission of the first search wave of a next cycle begins during transmission of the second search wave of the current cycle, and
a time interval between the start of transmission of the first search wave of the current cycle and the start of transmission of the second search wave of the current cycle differs from a time interval between the start of transmission of the second search wave of the current cycle and a start of transmission of the first search wave of the next cycle.

2. The object detection device according to claim 1, wherein
the drive signal generation unit generates the first drive signal and the second drive signal, and
the first search wave has a predetermined modulated state and the modulated state of the second search wave is different from that of the first search wave.

3. The object detection device according to claim 1, wherein
the control unit causes the drive signal generation unit to output the first drive signal and the second drive signal, and
a difference between the time interval between the start of transmission of the first search wave of the current cycle and the start of transmission of the second search wave of the current cycle and the time interval between the start of transmission of the second search wave of the current cycle and a start of transmission of the first search wave of the next cycle is equal to or greater than a time period in which the object is undetectable due to reverberation in the transmitter.

4. The object detection device according to claim 1, wherein
the drive signal generation unit generates the first drive signal and the second drive signal, and
the first search wave and the second search wave have different frequency-modulation schemes.

5. The object detection device according to claim 4, wherein
the drive signal generation unit generates the first drive signal and the second drive signal, and
the first search wave and the second search wave have different chirp-encoding schemes.

6. The object detection device according to claim 1, wherein
the drive signal generation unit generates the first drive signal and the second drive signal, and
the first search wave and the second search wave have different phase-modulated states.

7. The object detection device according to claim 1, wherein
the drive signal generation unit generates the first drive signal and the second drive signal, and
the first search wave and the second search wave have different on-off-modulated states.

8. The object detection device according to claim 1, wherein
the transmitter is configured to transmit the first search wave and the second search wave by a transceiver as the transmitter, and to receive reflected waves of the first search wave and the second search wave by the transceiver to generate a received signal corresponding to a distance to the object.

9. The object detection device according to claim 1, wherein
the control unit causes the drive signal generation unit to output the first drive signal and the second drive signal to the transmitter at different timings, and
the first search wave and the second wave are transmitted in a predetermined manner.

* * * * *